US007131111B2

(12) United States Patent
Passanisi

(10) Patent No.: US 7,131,111 B2
(45) Date of Patent: Oct. 31, 2006

(54) DEVELOPMENT OF MANIFEST FOR JAVA EMBEDDED SERVER BUNDLE

(75) Inventor: Brandon J. Passanisi, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 866 days.

(21) Appl. No.: 09/766,209

(22) Filed: Jan. 19, 2001

(65) Prior Publication Data

US 2002/0099845 A1 Jul. 25, 2002

(51) Int. Cl.
*G06F 9/44* (2006.01)

(52) U.S. Cl. ..................................... 717/121

(58) Field of Classification Search ........ 717/100–107, 717/116, 125; 707/2, 10, 102, 103 R; 709/202, 709/238, 245; 713/201; 345/751; 703/6, 703/13; 719/315
See application file for complete search history.

(56) References Cited

U.S. PATENT DOCUMENTS

| | | | |
|---|---|---|---|
| 6,237,135 B1 * | 5/2001 | Timbol ........................ 717/107 |
| 6,272,673 B1 * | 8/2001 | Dale et al. .................. 717/100 |
| 6,385,769 B1 * | 5/2002 | Lewallen ..................... 717/125 |
| 6,633,888 B1 * | 10/2003 | Kobayashi ............... 707/103 R |
| 6,744,447 B1 * | 6/2004 | Estrada et al. ............... 345/751 |
| 2002/0059054 A1 * | 5/2002 | Bade et al. .................... 703/20 |
| 2002/0103927 A1 * | 8/2002 | Parent ......................... 709/238 |
| 2002/0147763 A1 * | 10/2002 | Lee et al. .................... 709/202 |

OTHER PUBLICATIONS

Orfali et al., "Client/Server Programming with Java and Corba", 2nd ed. Wiley Publsh., 1997, chapter 36, pp. 905-932.*
Template Software, inc, WorkFlow Template Using the WFT Development Environment, Copyright 1998, pp. 2-25 to 2-30; pp. 2-35 to 2-37.*
Son, Seungwoo, et al.; "*A Component-Based Client/Server Application Development Environment Using Java*"; 1998; pp. 168-179; IEEE.
Minnick, Chris; "*Open Source Forte For Java*"; Software Development; Oct. 2000; pp. 21-24; vol. 8, No. 10; San Francisco, CA; USA.
Jordan, David; "*Java In The Home: OSGi Residential Gateways*"; Java Report; Sep. 2000; pp. 38-39, 41-42, 104.
Faison, Ted; "*Interactive Component-Based Software Development With Espresso* ", 1997; pp. 293-294; IEEE.

* cited by examiner

*Primary Examiner*—Wei Zhen
*Assistant Examiner*—Tuan Anh Vu
(74) *Attorney, Agent, or Firm*—Osha Liang LLP

(57) ABSTRACT

An apparatus and method for facilitating development of Java Embedded Server bundles which includes a module containing a set of development tools used in the creation of Java Embedded Server bundles. The module may include a code template tool having sample code segments; a Java Embedded Server manifest generator tool that creates Java Embedded Server manifest files for Java Embedded Server bundles; a Java Embedded Server jar packager tool that packages Java Embedded Server bundles; and a web page link tool having links to Java Embedded Server-related web pages.

15 Claims, 12 Drawing Sheets

DEVELOPMENT OF MANIFEST FOR JAVA EMBEDDED SERVER BUNDLE

FIELD OF THE INVENTION

This invention relates to the field of software development tools.

BACKGROUND OF THE INVENTION

The basic functionality of a computer is dictated by the type of operating system it uses. Various operating systems exist in the market place, including Solaris from Sun Microsystems, Macintosh from Apple Computers, the "Windows" Operating Systems, e.g., Windows 95/98 and Windows NT, from Microsoft, and Linux. The different types of operating systems will be referred to herein as "platforms". Prior to the popularity of the Internet, software developers wrote programs specifically designed for individual platforms. Thus, a program written for one platform could not be run on another. However, the advent of the Internet made cross-platform compatibility a necessity.

Prior art FIG. 1 illustrates a conceptional arrangement wherein a first computer (3) running the Solaris platform and a second computer (5) running the Windows 98 platform are connected to a server (9) via the internet (7). A resource provider using the server (9) might be any type of business, governmental, or educational institution. The resource provider has a need to be able to provide its resources to both the user of the Solaris platform and the user of the Windows 98 platform, but does not have the luxury of being able to custom design its content for the individual platforms.

The Java™ programming language was developed by Sun Microsystems to address this problem. The Java™ programming language was designed to be simple for the programmer to use, yet able to run securely over a network and work on a wide range of platforms.

Referring to FIG. 2, in order to create a Java™ application, the developer first writes the application in human-readable Java™ source code. As used herein, the term "application" refers to both true Java™ applications and Java™ "applets" which are essentially small applications usually embedded in a web page. In the example shown, the application "Program" (11) is created as a human-readable text file. The name of this text file is given the required five-character extension "java".

The Java™ compiler or "javac" (13) is used to compile the source code into a machine-readable binary file (15). The text file will contain Java™ language commands, e.g., "import java.awt.frame". A discussion of the Java™ language itself is beyond the scope of this document. However, complete information regarding the Java™ programming language and the Java™ platform are available from Sun Microsystems both in print and via the internet at java.sun.com. The resulting binary file (15) will automatically receive the same file name as the source text file, but will use ".class" as the trailing extension. The Java™ runtime environment incorporates a Java™ "virtual machine" (JVM) (16) to convert the ".class" byte codes into actual machine executions (17). The machine executions (like drawing windows, buttons, and user prompt fields) will occur in accordance to the application developer's code instructions. Because Sun Microsystems specifically designed the JVM (16) to run on different platforms, a single set of ".class" byte codes will execute on any platform where a JVM (16) has been installed. An Internet browser such as Netscape and Microsoft Explorer that incorporates a JVM (16) is called a "java-enabled" browser.

The cross-platform architecture of the Java™ programming language is illustrated in FIG. 3, which shows how the Java™ language enables cross-platform applications over the Internet. In the figure, the computer (3) running the Solaris platform and the computer (5) running the Windows 98 platform are both provided with the JVM (16). The resource provider creates a Java™ application using the Java™ software development kit ("SDK") (23) and makes the compiled Java™ byte codes available on the server (9), which in this example is running on a Windows NT platform. Through standard internet protocols, both the computer (3) and the computer (5) may obtain a copy of the same byte code and, despite the difference in platforms, execute the byte code through their respective JVM.

As the popularity of the Internet has increased, users have become accustomed to many different types of interfaces. Thus, aesthetic conformity has become less of an issue. At the same time, speed, functionality, and versatility have become increasingly important. Therefore, the Java™ 2 standard edition SDK includes a new "package" for the developer called "swing" that is essentially library of "lightweight components". This new package is simply one library that is possible; other libraries may be created and in fact are available from third parties. Swing provides the developer with the option and flexibility to use lightweight components and thus improves performance in a given application. A detailed discussion of the use of the Java™ abstract windowing toolkit (AWT) and the Swing package is beyond the scope of this document. Complete documentation is available from Sun Microsystems both in print and at the web site java.sun.com.

Forte™ for Java™ products (90), formerly called NetBeans, are visual programming environments written entirely in Java™ and Swing. These products are commonly regarded as the leading Integrated Development Environment (IDE). IDEs are easily customizable and extensible, as well as platform independent, as is illustrated in FIG. 5. Forte™ for Java™ (90) includes a powerful Form Editor (92), integrated full-featured text editor (94), visual GUI design (96), debugger (98), and compiler (100). Forte™ for Java™ (90) is also completely modular. Also, Forte™ for Java™ (90) is built around a set of Open Application Programming Interface (API's) which allow it to be easily extensible. This means that the IDE functionality for editing, debugging, GUI generation, etc. is represented in modules that can be downloaded and updated dynamically as is illustrated in FIG. 5. Instead of waiting months for a completely new release, as soon as new versions (104) or new modules (106) are available, users can update that individual version or module via the Update Center (102).

SUMMARY OF THE INVENTION

In one aspect, the invention is an apparatus and a method for facilitating the development of Java Embedded Server bundles, which includes a module containing a set of development tools used in the creation of Java Embedded Server bundles.

In one or more embodiments, the module may be adapted for inclusion in an Integrated Development Environment (IDE), the module may be accessible via a drop-down menu, and the module may be updated via an update mechanism while included in the IDE.

In one or more embodiments, the module may include a code template tool having sample code segments; a Java Embedded Server manifest generator tool that creates Java Embedded Server manifest files for Java Embedded Server bundles; a Java Embedded Server jar packager tool that packages Java Embedded Server bundles; and a web page link tool having links to Java Embedded Server-related web pages.

DETAILED DESCRIPTION OF THE INVENTION

Figure 1:
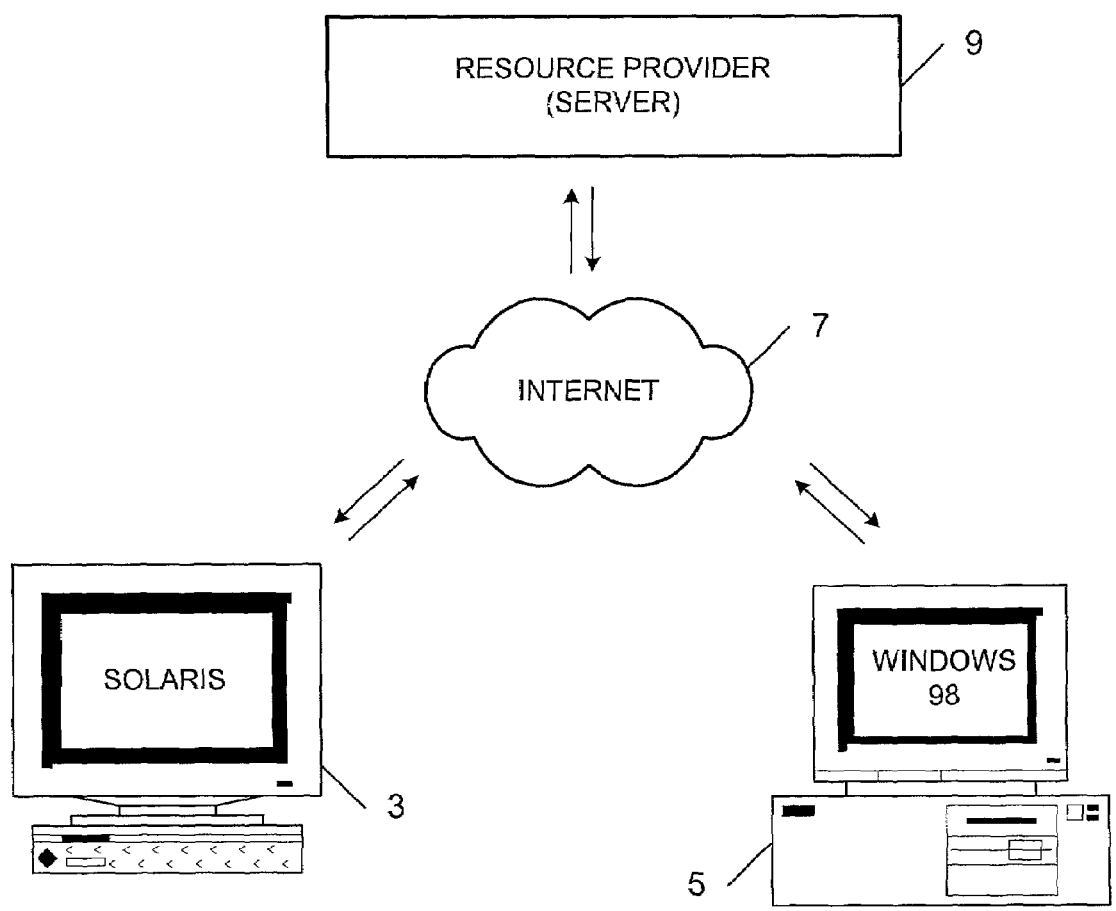
FIG. 1 illustrates a multiple platform environment.
Figure 2:
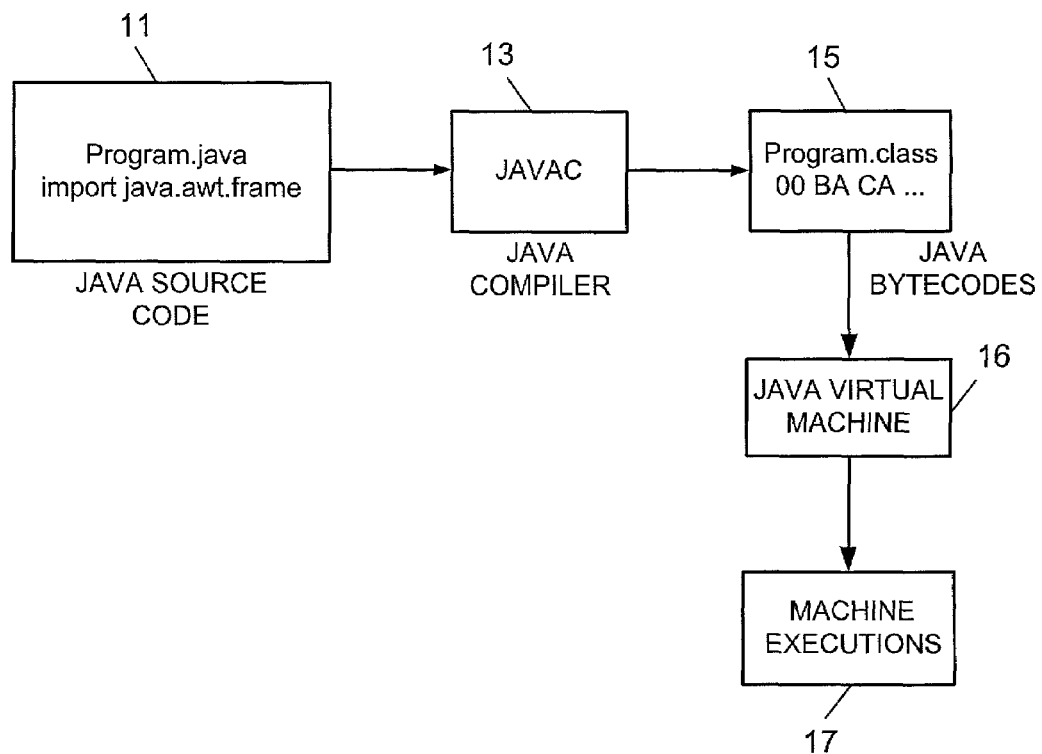
FIG. 2 illustrates a mechanism for creating Java™ applications.
Figure 3:
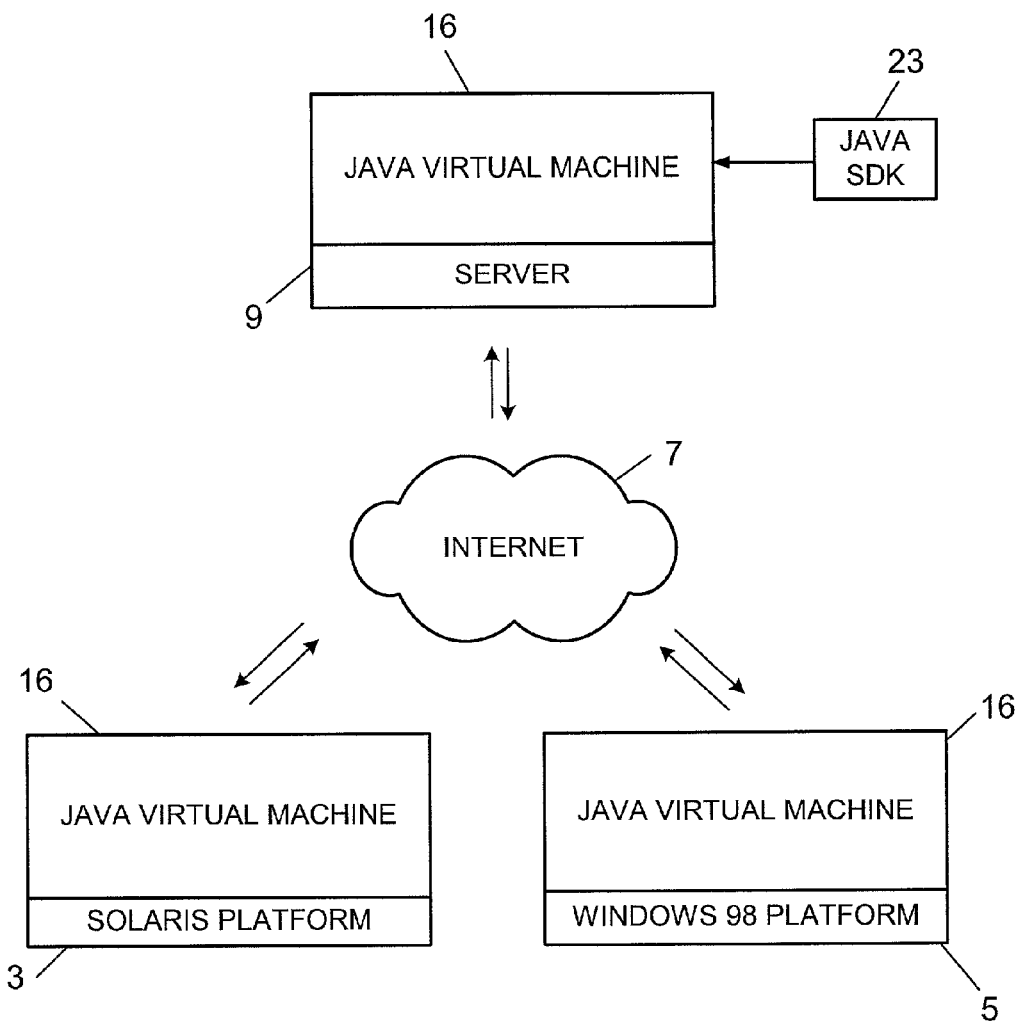
FIG. 3 illustrates a Java™ application running in a multiple platform environment.

Specific embodiments of the invention will now be described in detail with reference to the accompanying figures. Like elements in the various figures are denoted by like reference numerals for consistency.

Figure 4:
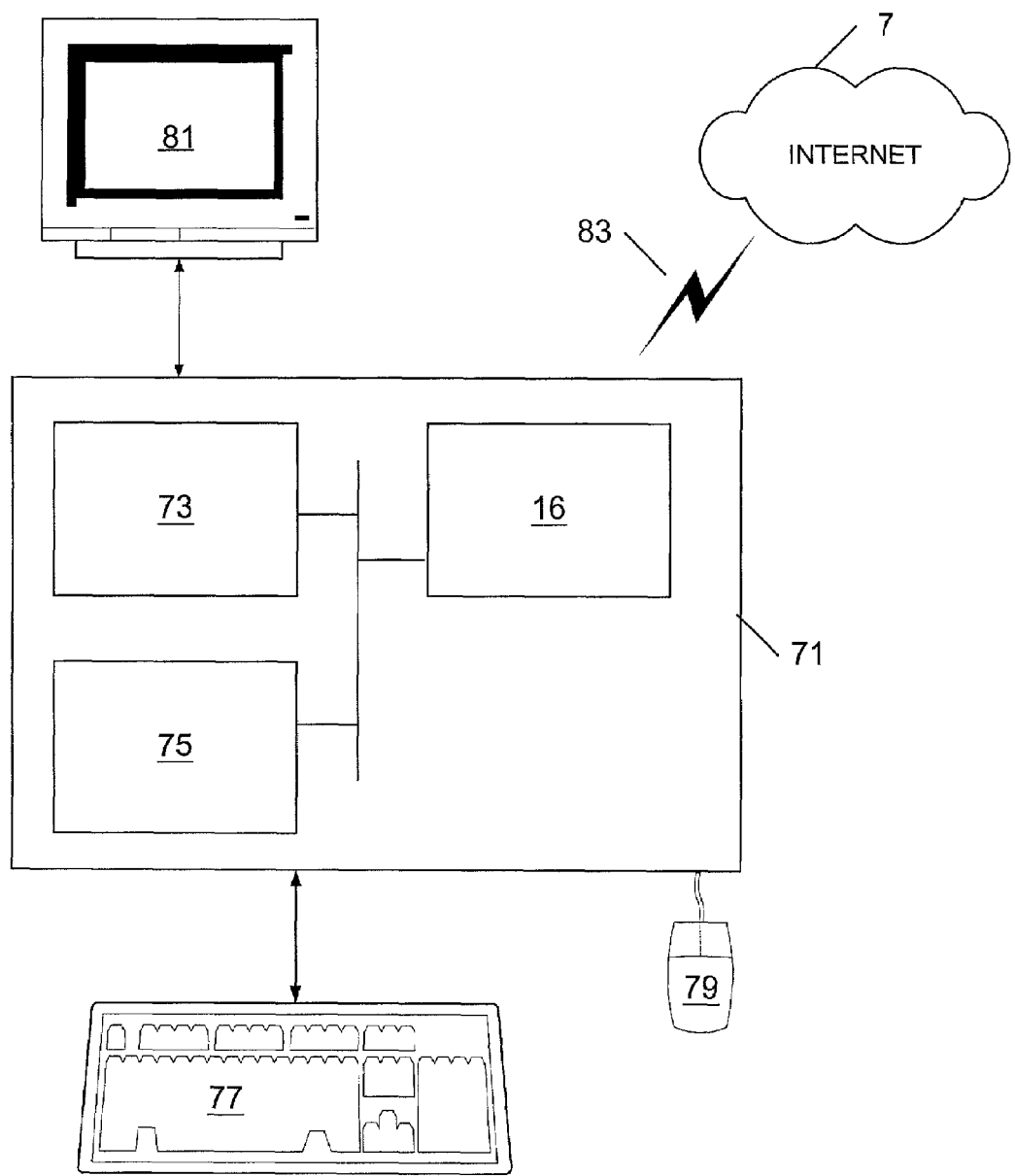
FIG. 4 illustrates a typical computer and its components as they relate to the Java™ virtual machine.

The invention described here may be implemented on virtually any type computer regardless of the platform being used. For example, as shown in FIG. 4, a typical computer (71) comprising a processor (73), associated memory (75), and numerous other elements and functionalities typical to today's computers (not shown). The computer (71) may further comprise input means, such as a keyboard (77) and a mouse (79), and an output device, such as a monitor (81). Those skilled in the art will appreciate that these input and output means may take other forms. Computer (71) is connected via a connection means (83) to the Internet (7). The computer (71) is configured to run a JVM (16), implemented either in hardware or in software.

Figure 5:
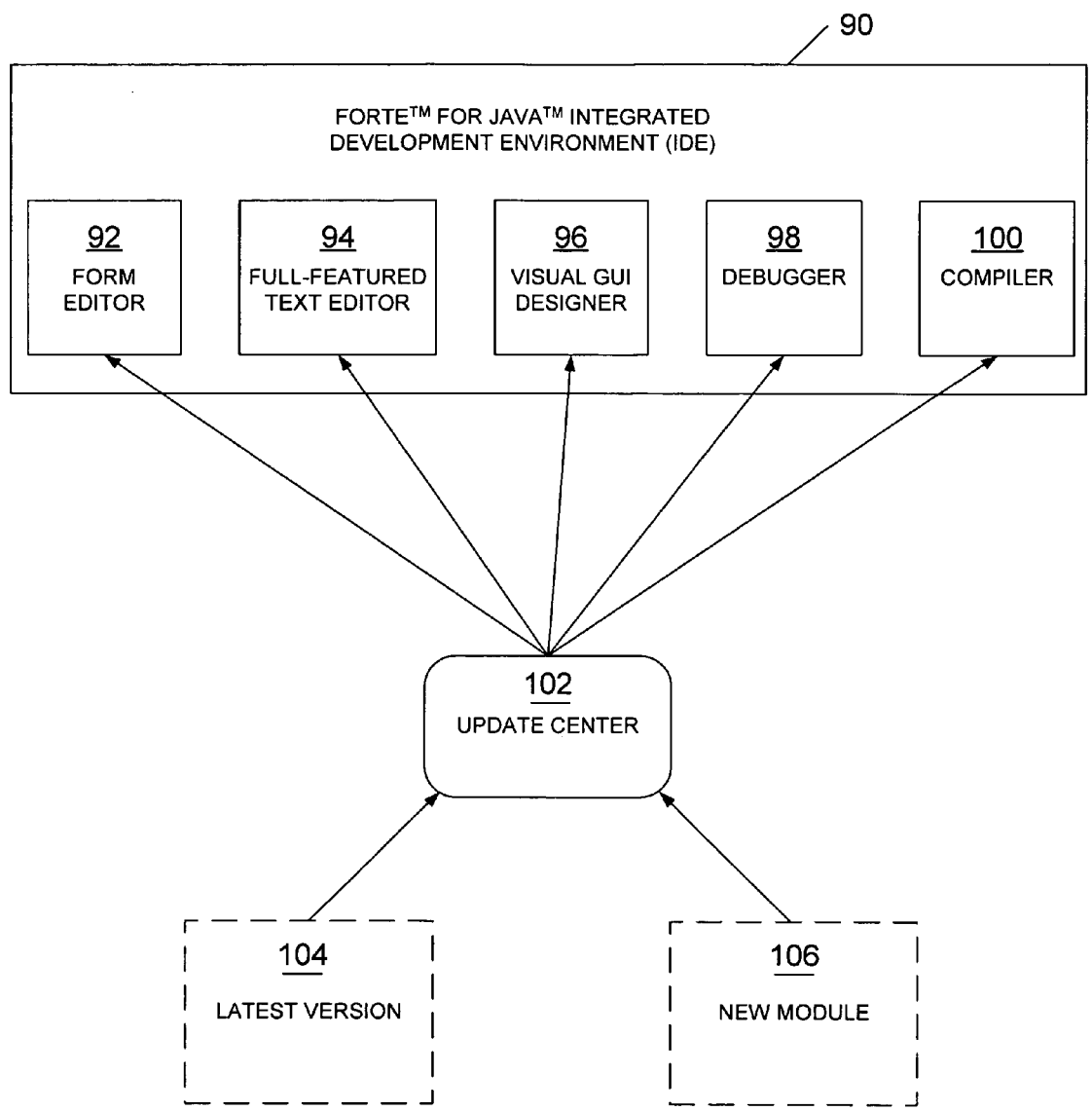
FIG. 5 illustrates a Forte™ for Java™ Integrated Development Environment (IDE)

Returning to the Forte™ for Java™ Integrated Development Environment (IDE) (90) example shown in FIG. 5, it would be desirable to have a module to be used within Forte™ for Java™ (90) or any other IDE having all development tools necessary to create Java™ Embedded Server (JES) bundles in one package.

Figure 6:
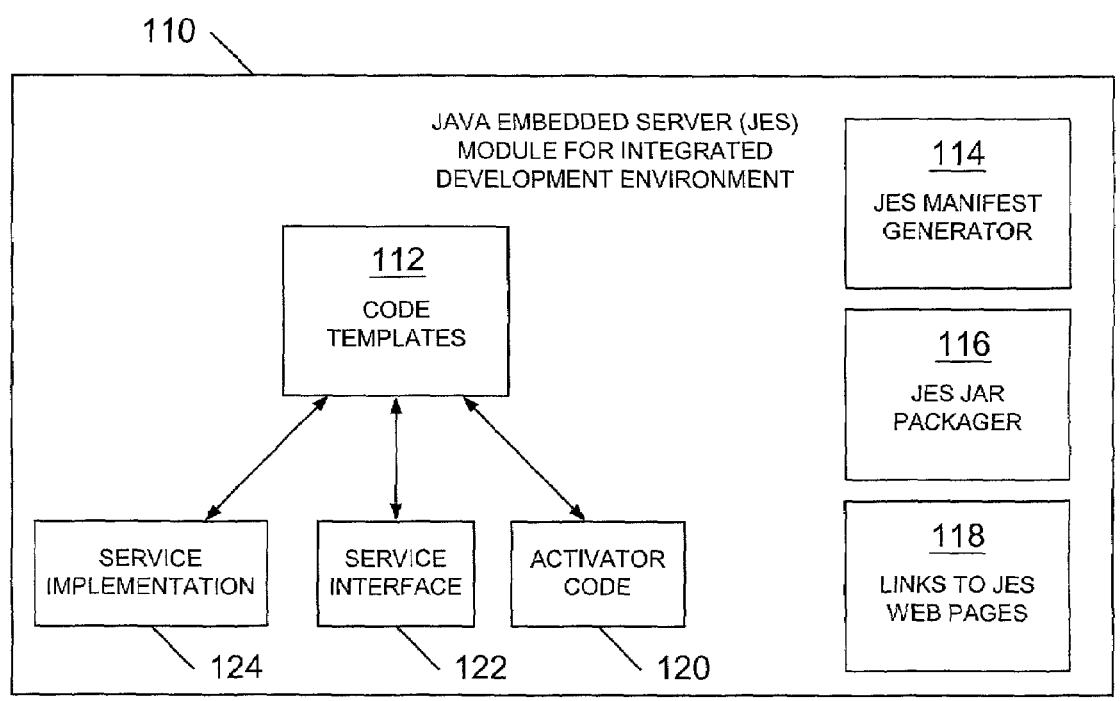
FIG. 6 illustrates a Java Embedded Server module in accordance with one embodiment of the present invention.

Java Embedded Server Module (i.e., a plug-in module) (110) for the Forte for Java™ IDE (90), as shown in FIG. 6, contains tools which facilitates creation of Java Embedded Server bundles. The Java Embedded Server Module (110) contains a code template tool (112), a Java Embedded Server Manifest Generator tool (114) to help in creating a valid Java Embedded Server manifest file for the bundle, and a Jar Packager tool (116) which helps packaging up the bundle. Also, links to web pages (118) containing documentation and other information about Java Embedded Server are included. Further, access to Java Embedded Server Swing-based tools from within the module may be included.

Figure 8:
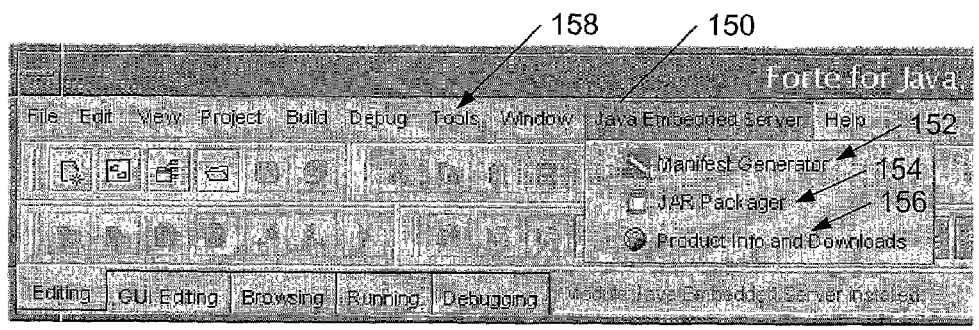
FIG. 8 is a computer screen shot illustrating the drop-down menu in accordance with one embodiment of the present invention having a Manifest Generator, a JAR Packager, and Product Info and Downloads submenus.

An embodiment of the plug-in Java Embedded Server module (110) is accessed via a drop-down menu in Forte for Java™ (90) entitled 'Java Embedded Server' (150) as shown in FIG. 8. As can be seen, the drop-down menu consists of three submenus entitled 'Manifest Generator' (152), 'Jar Packager' (154), and 'Product Info and Downloads' (156) which provide access to a selected feature of the Java Embedded Server module (110) identified by submenu name. The submenus are displayed by clicking on the 'Java Embedded Server' menu name (150) with the mouse (79). By continuing to hold the mouse button down and dragging the mouse pointer over the desired submenu name, the submenu name is selected upon release of the mouse button. The result of selecting the submenu is the launching of the application to perform the selected submenu feature by the system.

Figure 7:
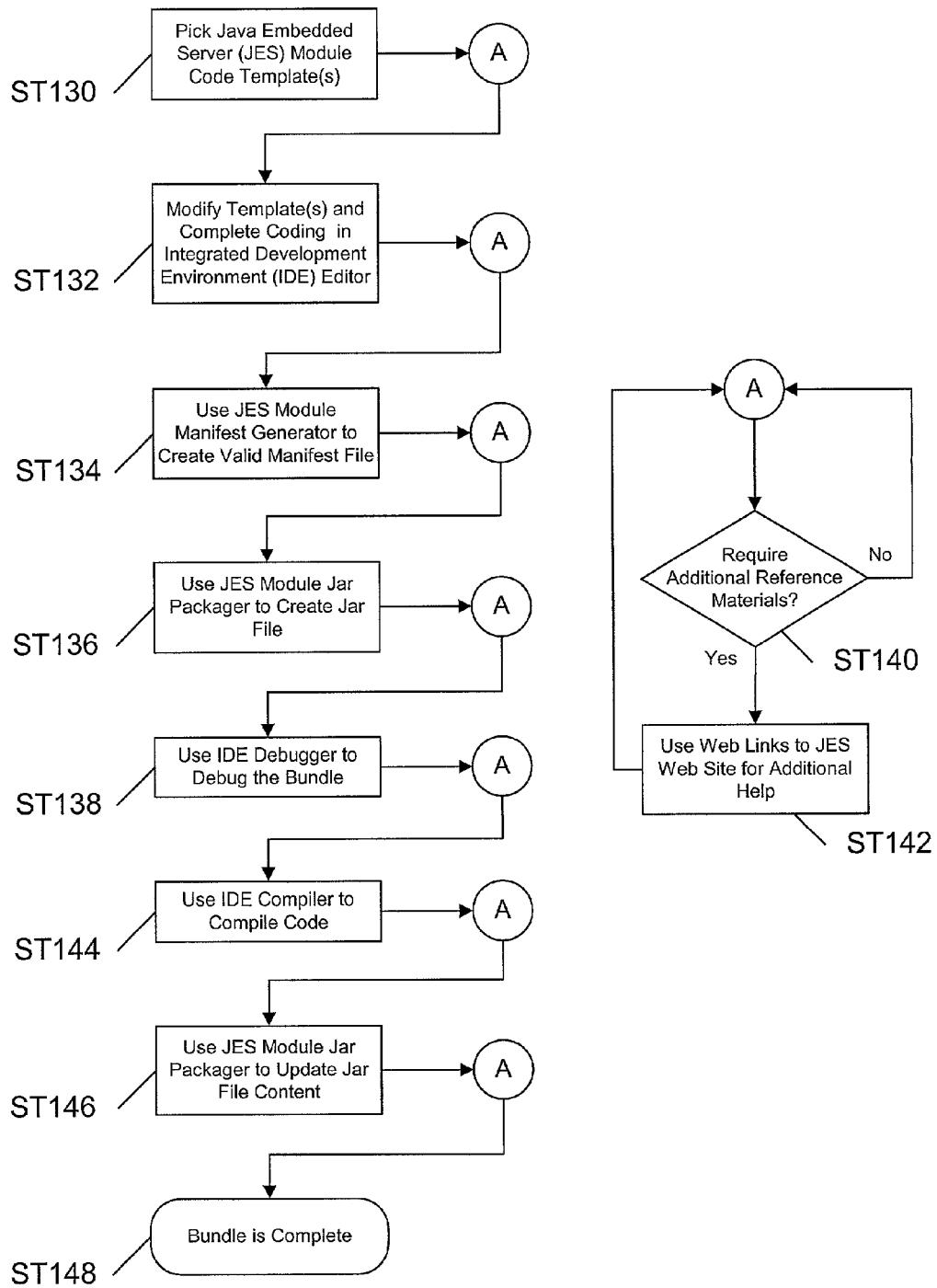
FIG. 7 is a flowchart illustrating a process in accordance with one embodiment of the present invention.

Referring to FIG. 7, an example for the usage of Java Embedded Server module (110) by a bundle-writer for developing Java Embedded Server bundles follows. The bundle-writer first uses the Java Embedded Server code template tool to retrieve and organize code that can be used as a starting point for the remaining development (ST130). The bundle-writer then finishes the code for the bundle (ST132) and is ready to package the code to be used with the Java Embedded Server Framework.

In order to accomplish this, a valid manifest file for the Java Embedded Server bundle must be written. The bundle-writer uses the Java Embedded Server Manifest Generator tool (114) to create a valid manifest file (ST134). Next, the bundle-writer uses the Jar Packager tool (116) to create the bundle's jar file (ST136). The bundle-writer must then debug the bundle. Using the Forte for Java™ debugger (98), the bundle-writer can correct any problems that need to be fixed (ST138). Using the supplied links within the 'Java Embedded Server' menu (150) to 'Product Info and Downloads' (156) which provides online Java Embedded Server documentation, the bundle-writer can find the material that may be a resource to what changes need to be made (ST142). Further links are contained, including links to documentation, FAQ's, technical support that can be used by the programmer to come up with a solution to the problem. These supplied links may also be used as reference points during all stages in the bundle development cycle (ST140). The code is compiled by the compiler (100) (ST144) and the bundle-writer can update the jar file content with a click of the mouse (79) (ST146). With the code compiled, the bundle is created and the process ends (ST148).

Figure 9:
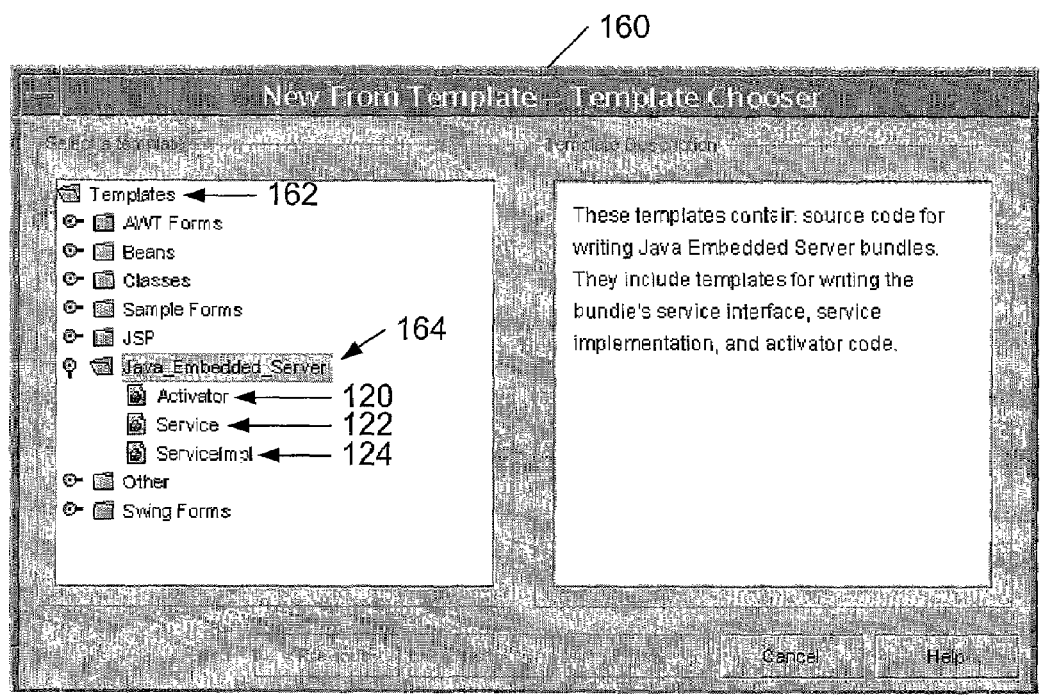
FIG. 9 is a computer screen shot illustrating a Code Template tool dialog box in accordance with one embodiment of the present invention.

An embodiment of the Java Embedded Server Code Template tool (112), as shown in FIG. 9, is used to get a bundle-writer started writing Java Embedded Server bundles. The bundle-writer begins using the Java Embedded Server code templates (112), which have been provided for the bundle-writer. The Java Embedded Server code templates are accessed through the 'New From Template' dialog box (160). The 'New From Template' dialog box (160) appears when the 'New From Template' menu item is selected from 'Tools' menu (158), similar to any template within Forte™ for Java™ (90). As can be seen, the 'Java Embedded Server' folder (164) is listed under the 'Templates' folder (162) in the 'New From Template' dialog box (160). In one embodiment, the Java Embedded Server templates (112) comprise the following:

1) Activator Code (120): A template for writing bundle's Activator class;
2) Service Interface (122): A template for writing bundle's interface class; and
3) Service Implementation (124): A template for writing bundle's implementation.

Once the template file(s) appear in the Forte™ for Java™ Text Editor (94), the bundle-writer can begin developing the bundle from sample code.

Figure 10:
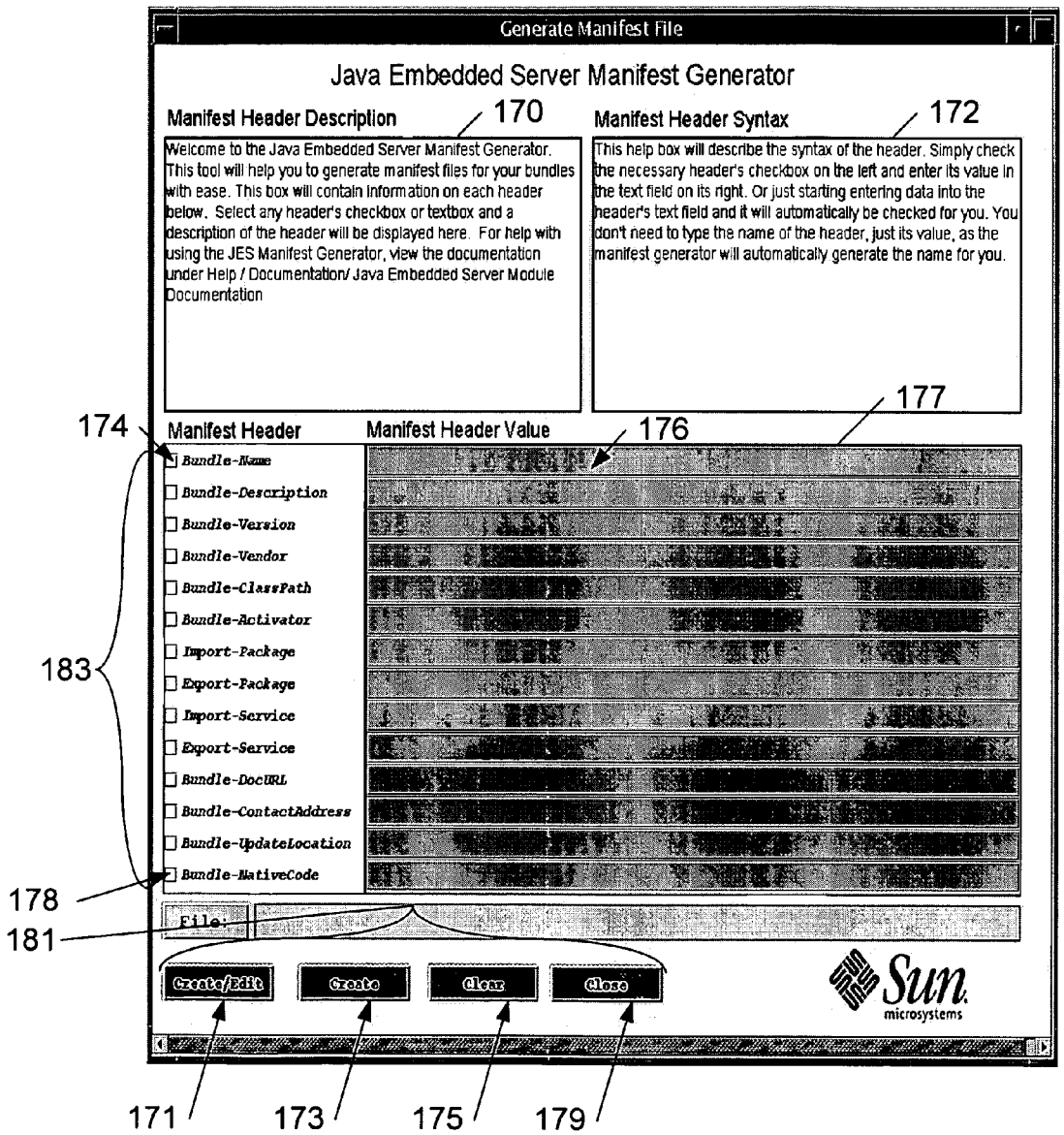
FIG. 10 is a computer screen shot illustrating the Manifest Generator tool dialog box in accordance with one embodiment of the present invention.

An embodiment of the Java Embedded Server Manifest Generator tool (114), as shown in FIG. 10, is an aid in creating valid manifest files for Java Embedded Server bundles. The Manifest Generator (114) saves development time by providing each Java Embedded Server manifest header name 183 along with the description (170), the syntax (172), and an example of the use of the particular manifest header (174) (e.g., Bundle-Name). To start the Java Embedded Server Manifest Generator (114), the 'Manifest Generator' menu item (152) is selected from the 'Java Embedded Server' menu (150). Two text boxes are located near the top of the screen which hold the descriptions (170) and syntax (172) of the manifest header, a listing of each Java Embedded Server manifest header name to the left and its corresponding manifest header value (176) in the text field (177) to the right. Also, action buttons (181) appear at the bottom of the screen.

When first starting the Java Embedded Server Manifest Generator (114), text is displayed inside each of the two help boxes at the top of the screen. These help boxes display the description (170) and syntax (172) of each manifest header (183). To view the help file on a particular manifest header name 174, the name of the particular manifest header 174 is selected for the left help box or the corresponding text field (177) is selected from the right help box. The selection is made by clicking or tabbing to the area. A brief description (170) of the manifest header is displayed in the box labeled 'Manifest Header Description' (170) and the syntax (172) is displayed in the box labeled 'Manifest Header Syntax.'

A particular header name (174) in the generated manifest file is included when the header's checkbox (178) is selected. When checking a header name (183), the corresponding text field background changes from gray to white. The value of the header (176) is entered into the text field (177) immediately to the right of the header name (183). Another way to include a header (183) into the manifest file is to type the value (176) into the text field (177). As soon as the manifest header value (176) is entered into the text field (177), a checkbox (178) gets checked.

Before or after entering the manifest header values (176), the name of the manifest file to be generated is selected. If the file already exists, a prompt is given to overwrite the existing file. It is recommended to use the extension "*.MF", "*.mf", or "*.txt" when naming the manifest file. The reason is because these extensions are, by default, textual objects that Forte· for Java™ (90) recognizes.

After selecting the file name and entering in the manifest header values (176), selecting the 'Create/Edit' button (171) generates the manifest file. The manifest file is placed in a file in the text editor (94) to view its contents and/or make any final modifications. To generate the file, but not start the editor, the 'Create' button (173) can be selected. Once the file is generated, a message reflecting the completion is displayed. To clear all entered data and start over, the 'Clear' button (175) can be selected. When finished, the 'Close' button (179) is used to exit.

In one embodiment of the Java Embedded Server Manifest Generator (114), a simple template of all the possible Java Embedded Server 2.0-related manifest headers (174) is included. Once the template is chosen, all of the manifest headers (174) are put into a file in the editor. The bundle-writer fills in the necessary values (176) next to each header (174) that is being used. In one embodiment, the bundle's source files are parsed to generate the entire or at least portions of the manifest file.

Figure 11:
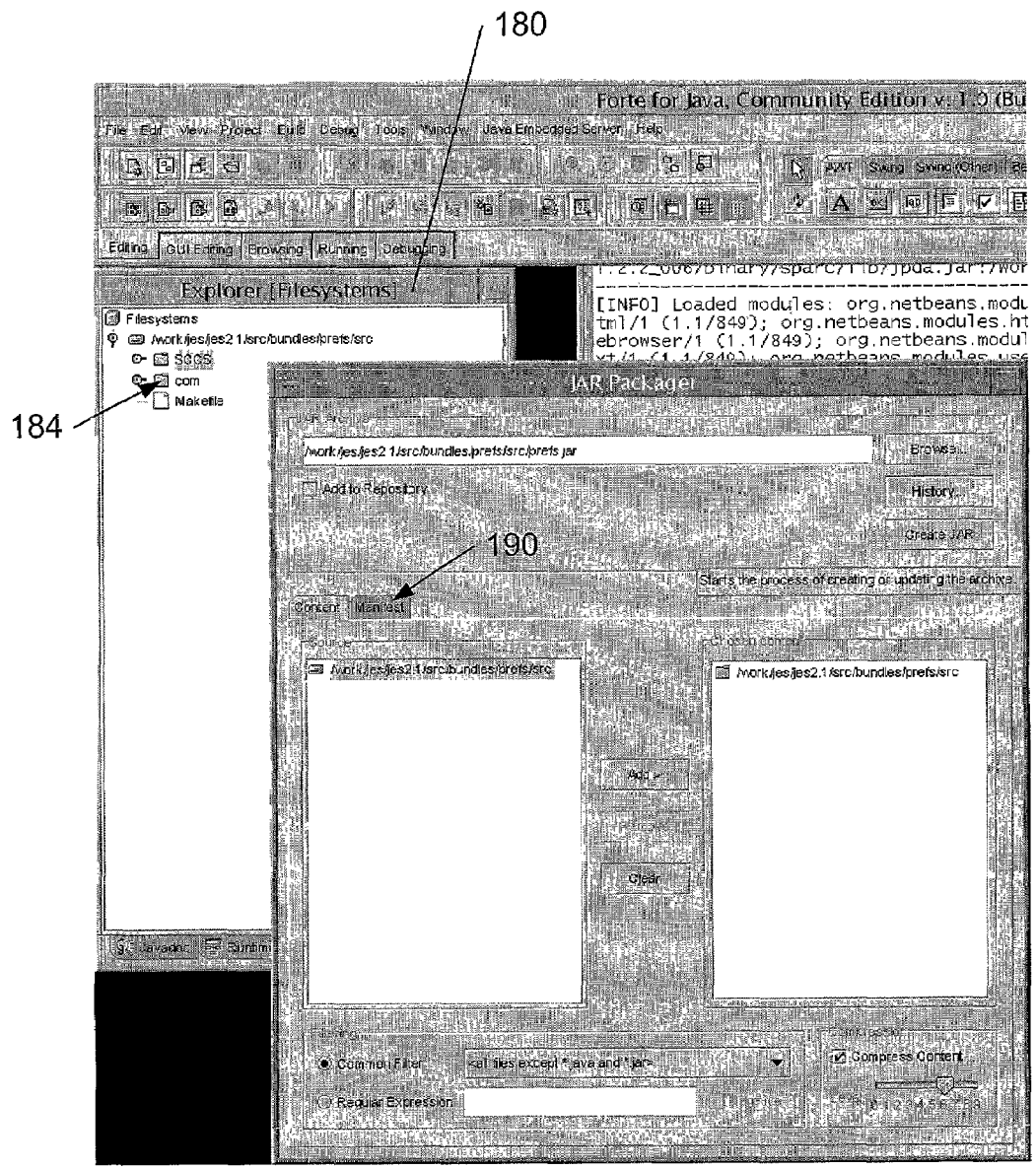
FIG. 11 is a computer screen shot illustrating the JAR Packager tool dialog box in accordance with one embodiment of the present invention.

When the bundle-writer is ready to package up the Java Embedded Server bundle using the Jar Packager (116), select the contents to be packaged from the Explorer window (180) a shown in FIG. 11. For example, if the bundle is in the package com.my.company.bundle, one should select the 'com' folder (184) in the Explorer window (180). Either one of the following can be used to start the Jar Packager (116):

1) with the mouse (79) on the selected folder, right-click and select 'Add To Jar' or select the 'Jar Packager' menu item (154) under the 'Java Embedded Server' menu (150); or
2) select the 'Jar Packager' menu item (not shown) under the 'Tools' menu (158).

Figure 12:
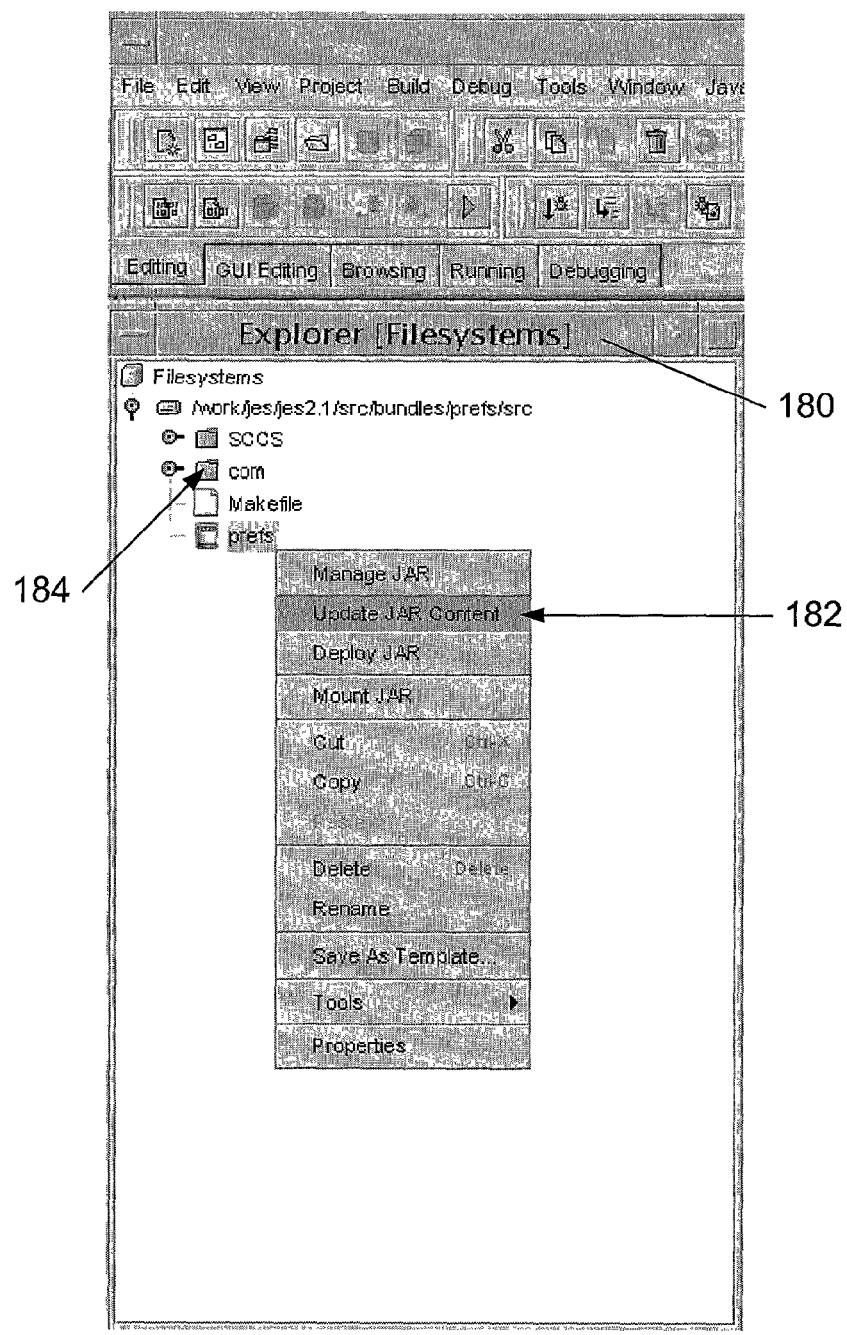
FIG. 12 is a computer screen shot illustrating the JAR Packager tool menu and specifically the 'Update JAR Content' menu item in accordance with one embodiment of the present invention.

To include the manifest file previously created into the jar file, select 'Load Manifest From File' and choose the previously created manifest file. Or, simply copy the contents of the file into the area within the 'Manifest' tab (190) of the Jar Packager (116). The Jar Packager GUI interface should only be used once as all subsequent versions of the jar file can be made by simply right-clicking the mouse (79) on the jar file in the Explorer window (180) and selecting the 'Update JAR Content' menu item (182) as shown in FIG. 12.

Various embodiments of the invention have been described above using the Java™ environment running on a Solaris or Windows native platform. However, the methodology described is not limited in its implementation to a particular programming language, nor is the inclusion of the Solaris and Windows platform examples intended to be limiting as to the types of native platforms on which the invention may be employed. Accordingly, the invention is not limited to the particular embodiments or platforms described in the exemplary embodiments above, but rather is limited only of the scope of the appended claims.

What is claimed is:

1. An apparatus for facilitating development of Java Embedded Server (JES) bundles, comprising:
   a processor;
   a memory; and
   an Integrated Development Environment configured to execute a module comprising software instructions stored in the memory for enabling the module under control of the processor, to:
      generate JES bundles using a plurality of development tools, wherein the plurality of development tools comprise a JES manifest generator tool for creating a manifest file for JES bundles, wherein the JES manifest generator tool is configured to:

include at least one manifest header name associated with at least one manifest header by checking a box next to the at least one manifest header name;

display a help description of the one manifest header and a help syntax for the at least one manifest header;

enter the value of the at least one manifest header, consistent with the help syntax, into a text field beside the at least one manifest header name;

select a name for the manifest file, consistent with the help description; and generate the manifest file for JES bundles.

2. The apparatus of claim 1, wherein the module is accessible through a drop-down menu in the IDE.

3. The apparatus of claim 1, further comprising:
an update mechanism for updating the module while included in the IDE.

4. The apparatus of claim 1, further comprising:
a code template tool having sample code segments.

5. The apparatus of claim 4, wherein the code template tool contains a service interface template, a service implementation template and an activator code template.

6. The apparatus of claim 1, further comprising:
a Java Embedded Server jar packager tool that packages Java Embedded Server bundles.

7. The apparatus of claim 1, further comprising:
a web page link tool having links to Java Embedded Server-related web pages.

8. The apparatus of claim 1, further comprising:
a code template tool having commonly used sample code segments;
a Java Embedded Server manifest generator tool that creates Java Embedded Server manifest files for Java Embedded Server bundles; and
a Java Embedded Server jar packager tool that packages Java Embedded Server bundles.

9. A computer system for a method of facilitating development of Java Embedded Server bundles, comprising:
a processor;
a memory; and
software instructions stored in the memory for enabling the computer system under control of the processor, to:
combine, in a module, a plurality of development tools used in the creation of Java Embedded Server bundles; and
execute the module in an Integrated Development Environment (IDE), wherein the plurality of development tools comprise a JES manifest generator tool for creating a manifest file for JES bundles, wherein the JES manifest generator tool is configured to:
include at least one manifest header name associated with at least one manifest header by checking a box next to the at least one manifest header name;

display a help description of the at least one manifest header and a help syntax for the at least one manifest header;

enter the value of the at least one manifest header, consistent with the help syntax, into a text field beside the at least one manifest header name;

select a name for the manifest file, consistent with the help description; and generate the manifest file for JES bundles.

10. The method of claim 9, further comprising:
providing sample code segments.

11. The method of claim 9, further comprising:
creating Java Embedded Server manifest files for Java Embedded Server bundles.

12. The method of claim 9, further comprising:
packaging Java Embedded Server bundles.

13. The method of claim 9, further comprising:
providing link to Java Embedded Server-related web pages.

14. The method of claim 9, further comprising:
providing sample code segments;
creating Java Embedded Server manifest files for Java Embedded Server bundles; and
packaging Java Embedded Server bundles.

15. An apparatus for facilitating development of Java Embedded Server (JES) bundles, comprising:
means for providing sample code segments;
means for creating Java Embedded Server manifest files for Java Embedded Server bundles;
means for packaging Java Embedded Server bundles; and
means for executing a module into an Integrated Development Environment (IDE), wherein the plurality of development tools comprise a JES manifest generator tool executing in the IDE for creating a manifest file for JES bundles, wherein the JES manifest generator tool is configured to:
include at least one manifest header name associated with at least one manifest header by checking a box next to the at least one manifest header name;

display a help description of the at least one manifest header and a help syntax for the at least one manifest header;

enter the value of the at least one manifest header, consistent with the help syntax, into a text field beside the at least one manifest header name;

select a name for the manifest file, consistent with the help description; and generate the manifest file for JES bundles.

* * * * *